(12) United States Patent
Appuswamy et al.

(10) Patent No.: US 11,636,317 B2
(45) Date of Patent: Apr. 25, 2023

(54) LONG-SHORT TERM MEMORY (LSTM) CELLS ON SPIKING NEUROMORPHIC HARDWARE

(71) Applicant: INTERNATIONAL BUSINESS MACHINES CORPORATION, Armonk, NY (US)

(72) Inventors: Rathinakumar Appuswamy, San Jose, CA (US); Michael Beyeler, Seattle, WA (US); Pallab Datta, San Jose, CA (US); Myron Flickner, San Jose, CA (US); Dharmendra S. Modha, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 698 days.

(21) Appl. No.: 15/434,672

(22) Filed: Feb. 16, 2017

(65) Prior Publication Data

US 2018/0232631 A1 Aug. 16, 2018

(51) Int. Cl.
*G06N 3/04* (2006.01)
*G06N 3/063* (2006.01)
*G06F 13/16* (2006.01)
*G06F 13/40* (2006.01)
*G06N 3/049* (2023.01)

(52) U.S. Cl.
CPC ......... *G06N 3/049* (2013.01); *G06F 13/1689* (2013.01); *G06F 13/4068* (2013.01); *G06N 3/0445* (2013.01); *G06N 3/063* (2013.01)

(58) Field of Classification Search
CPC ...... G06N 3/049; G06N 3/04; G06F 13/1689; G06F 13/4068
See application file for complete search history.

(56) References Cited

U.S. PATENT DOCUMENTS

| 7,321,882 | B2 | 1/2008 | Jaeger | |
|---|---|---|---|---|
| 8,930,178 | B2 | 1/2015 | Pestian et al. | |
| 2014/0379625 | A1* | 12/2014 | Modha | G06N 3/02 706/25 |
| 2015/0039546 | A1* | 2/2015 | Alvarez-Icaza | G06N 3/0472 706/27 |
| 2016/0034812 | A1* | 2/2016 | Gibson | G06N 3/08 706/25 |

(Continued)

OTHER PUBLICATIONS

Lyu et al., Revisit Long Short-Term Memory: An Optimization Perspective (2014) (Year: 2014).*

(Continued)

*Primary Examiner* — Kakali Chaki
*Assistant Examiner* — Kevin L. Smith
(74) *Attorney, Agent, or Firm* — Erik A. Huestis; Stephen J. Kenny; Foley Hoag, LLP

(57) ABSTRACT

Long-short term memory (LSTM) cells on spiking neuromorphic hardware are provided. In various embodiments, such systems comprise a spiking neurosynaptic core. The neurosynaptic core comprises a memory cell, an input gate operatively coupled to the memory cell and adapted to selectively admit an input to the memory cell, and an output gate operatively coupled to the memory cell an adapted to selectively release an output from the memory cell. The memory cell is adapted to maintain a value in the absence of input.

19 Claims, 12 Drawing Sheets

(56) References Cited

U.S. PATENT DOCUMENTS

| | | | |
|---|---|---|---|
| 2016/0189027 A1 | 6/2016 | Graves et al. | |
| 2016/0232440 A1 | 8/2016 | Gregor et al. | |
| 2017/0116513 A1* | 4/2017 | Andreopoulos | G06N 3/0445 |
| 2017/0286828 A1* | 10/2017 | Smith | G06N 3/049 |
| 2018/0225564 A1* | 8/2018 | Haiut | G06N 3/049 |

OTHER PUBLICATIONS

Akopyan et al., "TrueNorth Design &Tool Flow of a 65 mW 1 Million Neuron Programmable Neurosynaptic Chip," IEEE 2015 (Year: 2015).*

Ahmed et al., Probabilistic Inference Using Stochastic Spiking Neural Networks on a Neurosynaptic Processor (Year: 2016).*

Zuo et al., Learning Contextual Dependence with Convolutional Hierarchical Recurrent Neural Networks, IEEE 2016 (Year: 2016).*

Diehl et al., "Conversion of Artificial Recurrent Neural Networks to Spiking Neural Networks for Low-power Neuromorphic Hardware," (2016) (Year: 2016).*

"Stochastic neural network," Wikipedia (2016), <https://web.archive.org/web/20160508135947/https://en.wikipedia.org/wiki/Stochastic_neural_network> (Year: 2016).*

Imam et al., "A Digital Neurosynaptic Core using Event-Driven QDI Circuits," IEEE 2012 (Year: 2012).*

Basegmez et al., "The next generation neural networks: Deep learning and spiking neural networks," 2014 (Year: 2014).*

Paugam-Moisy et al., "Computing with Spiking Neuron Networks," Springer (2012) (Year: 2012).*

Basegmez et al., "The Next Generation Neural Netowrks: Deep Learning and Spiking Neural Networks," (2014) (Year: 2014).*

Diehl et al., "Unsupervised Learning of Digit Recognition using Spike-Timing-Dependent Plasticity," Frontiers in Computational Neuroscience (2015) (Year: 2015).*

Lyu, Q. & Zhu, J. Revisit Long Short-Term Memory: An Optimization Perspective. CiteSeer.

Zazo, R., Lozano-Diaz, A. & Gonzalez-Dominguez, J. (2016). Language Identification in Short Utterance Using Long Short-Term Memory (LSTM) Recurrent Neural Networks. Plos One. doi:dx.doi.org./10.1371/journal.pone.0146917.

\* cited by examiner

LONG-SHORT TERM MEMORY (LSTM) CELLS ON SPIKING NEUROMORPHIC HARDWARE

BACKGROUND

Embodiments of the present invention relate to neuromorphic systems, and more specifically, to long-short term memory (LSTM) cells on spiking neuromorphic hardware.

BRIEF SUMMARY

According to embodiments of the present disclosure, long-short term memory systems are provided. In various embodiments, such systems comprise a spiking neurosynaptic core. The neurosynaptic core comprises a memory cell, an input gate operatively coupled to the memory cell and adapted to selectively admit an input to the memory cell, and an output gate operatively coupled to the memory cell an adapted to selectively release an output from the memory cell. The memory cell is adapted to maintain a value in the absence of input.

According to embodiments of the present disclosure, methods of and computer program products for sequence to sequence encoding are provided. A neuromorphic system is configured with a predetermined plurality of configuration parameters comprising synaptic weights and neuronal biases. The neuromorphic system comprises a memory cell, an input gate operatively coupled to the memory cell and adapted to selectively admit an input to the memory cell, and an output gate operatively coupled to the memory cell an adapted to selectively release an output from the memory cell. The memory cell is adapted to maintain a value in the absence of input. A first sequence of spikes is received at the neuromorphic system. The first sequence of spikes is transcoded by the neuromorphic system via the memory cell into a second sequence of spikes the transcoding being determined by the synaptic weights and neuronal biases.

DETAILED DESCRIPTION

Figure 1:
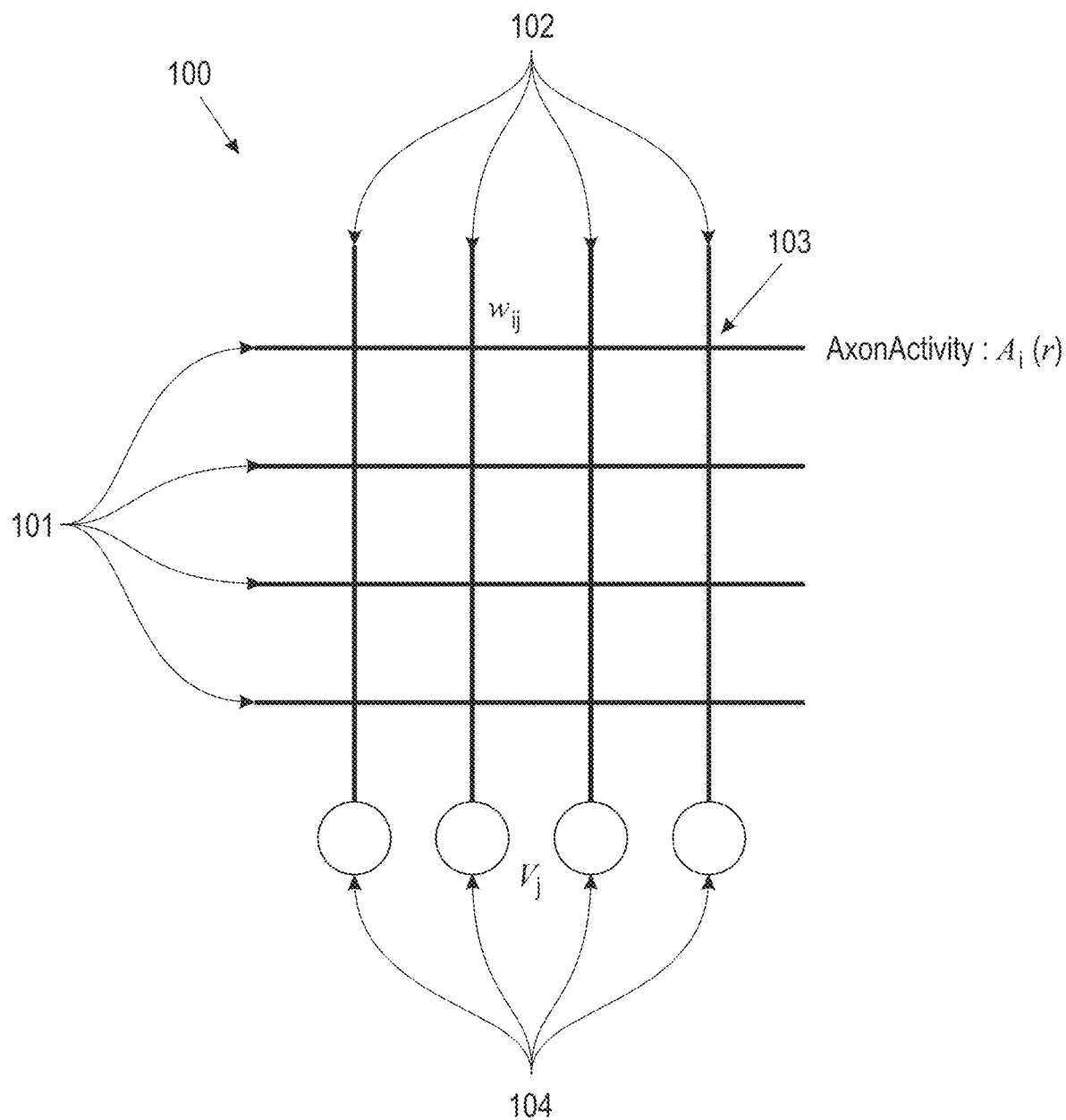
FIG. 1 depicts a neurosynaptic core according to embodiments of the present disclosure.

LSTM (Long Short-Term Memory) cell implementations are useful in a variety of applications such as sequence learning in general, speech recognition, and language modeling. Long short term memory (LSTM) recurrent neural networks are local in space and time and closely relate to a biological model of memory in the pre-frontal cortex. LSTMs outperform artificial RNN's on many artificially generated sequential processing tasks.

The present disclosure provides spiking neural network (SNN) implementations of LSTMs that is compatible with a neurosynaptic spiking architecture such as TrueNorth. In addition to the various general implementations provide herein, the present disclosure provides for a sequence to sequence transformation using LSTMs. Procedures are provided for mapping different parts of the computational primitive of LSTM onto the neurosynaptic architecture and for training a network of LSTM cells using back propagation to implement a sequence to sequence transformation task.

Arrays of extremely low power neurosynaptic processing units, called neurosynaptic cores, provide an architecture to solve exascale big data problems. These cores use spikes to encode information. In a network of neurosynaptic cores, neurons on each core can connect to any axon of any other neurosynaptic core (including itself). When a neuron spikes, it sends a spike packet that gets delivered to a target axon on a destination core.

In digital spiking neuromorphic systems, information is represented and delivered by spikes, where each spike is a digital packet of information, carrying one or more bits. For example, the IBM TrueNorth chip is a digital spiking neuromorphic system where each spike carries a single bit of information (a binary spike). Spiking neural networks such as TrueNorth are based on delivering packets of information over switched communication wires, thereby significantly reducing the required wiring. The presence of a spike is treated as receiving a 1, its absence represents a 0. More values can be coded into binary spikes using several different spike coding schemas.

A spike communication from a source neuron on a source core, to a target axon on a destination core, would effectively need to traverse certain number of hops via routers in a 2D grid in either the horizontal or vertical or a combination of both to be delivered to the target axon on a destination core. Each hop a spike packet traverses, consumes power and energy.

Within an exemplary neuromorphic system such as TrueNorth, a fixed amount of time is allowed for a spike to travel from its source neuron to its destination axon. This fixed window is referred to as a tick. The time a spike requires for its journey varies based on the distance the spike must travel and the number of 2-D mesh routing, chip and board interfaces that the spike travels across.

On each tick, the neurons in a core are processed sequentially, starting with the first neuron and continuing through the last neuron. Accordingly, in addition to the transmission delays discussed above, each spike is also delayed by some additional fixed amount based on which neuron on a core generated it. For example, in an exemplary neuromorphic system such as TrueNorth having 256 neurons per core, the 256th neuron is not processed until the preceding 255 neurons are processed.

According to various embodiments of the present disclosure, a neurosynaptic program represents a neurosynaptic network. A neurosynaptic program includes information relating to the neurosynaptic network. In some embodiments, the information includes neuronal properties and dynamics that determine an electronic neuron's response to input spikes. For example, neuronal properties and dynamics can include a threshold parameter, a leak parameter, a delay parameter, or a reset parameter. In some embodiments, the neurosynaptic program information includes synaptic connections of the neuron (e.g., synaptic connections made via a synaptic crossbar). In some embodiments, the neurosynaptic program information includes axon properties (e.g., axon types). In some embodiments, the neurosynaptic program information includes one or more destinations (e.g., target axons) that the neuron's output spike should be delivered to.

According to various embodiments, a neurosynaptic network represents an instantiation of a neurosynaptic program. A neurosynaptic network may be instantiated in hardware, in simulation or in both. For example, a neurosynaptic program may give rise to one or more instances of a neurosynaptic network, wherein the instances may reside on a single core, multiple cores, or multiple chips.

According to various embodiments, a neuromorphic core circuit represents an example neurosynaptic network described by a neurosynaptic program.

According to various embodiments, a corelet or a Corelet Programming Language represent software that provide abstraction of neurosynaptic programs. A composition of neurosynaptic programs may be created by composing corelets.

A TrueNorth program is a complete specification of a network of neurosynaptic cores, along with its external inputs and outputs. In various embodiments, a divide-and-conquer approach is adopted whereby a large network of neurosynaptic cores is constructed by interconnecting a set of smaller networks of neurosynaptic cores, where each of the smaller networks, in turn, could be constructed by interconnecting a set of even smaller networks, and so on, down to a network consisting of a single neurosynaptic core, which is the fundamental non-divisible building block. This programming paradigm is referred to as Corelet Programming.

With reference now to FIG. 1, a neurosynaptic core according to embodiments of the present disclosure is depicted. In some embodiments, neurosynaptic core 100 includes axons 101, represented as rows, dendrites 102, represented as columns, synapses 103, represented as row-column junctions, and neurons 104 that receive inputs from dendrites. In some embodiments, there are 256 axons, and 256 neurons. In such embodiments, there are 256×256=65,536 synapses. Information flows from axons 101 to the neurons 104, modulated by the synapses 103. In various embodiments, the synapses may be binary, and may be associated with synaptic weights.

Figure 2:
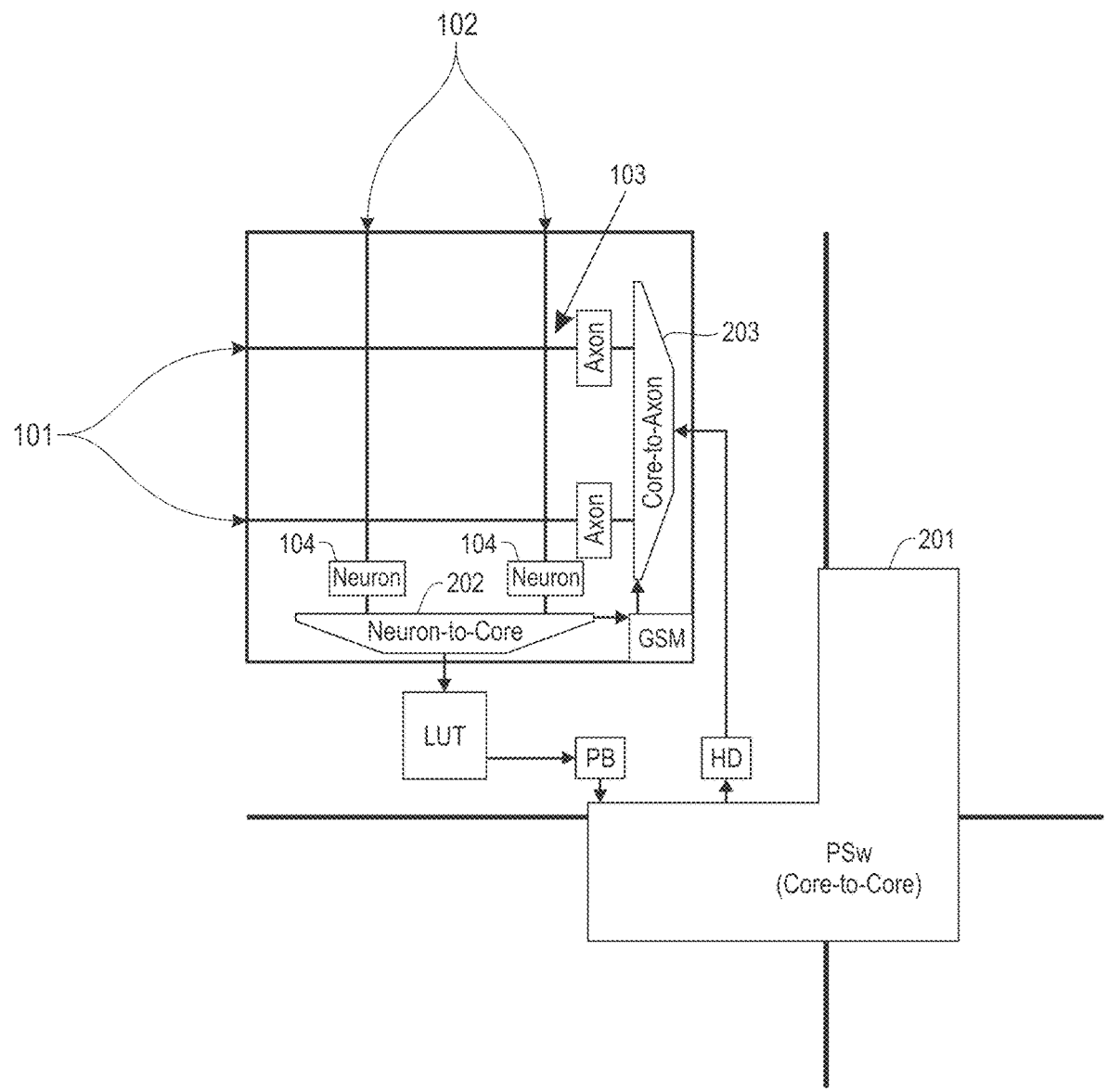
FIG. 2 depicts a neurosynaptic core and mesh router according to embodiments of the present disclosure.

In some embodiments a plurality of neurosynaptic cores are tiled on a chip. In an exemplary embodiments, a 64 by 64 grid of cores is tiled, yielding 4,096 cores, for a total of 1,048,576 neurons and 268,435,456 synapses. In such embodiments, neurons, synapses, and short-distance connectivity are implemented by the core circuit. Long-distance connectivity is logical. An exemplary embodiment is depicted in FIG. 2. Mesh router 201 provides communication between cores. Also on a given core, neuron to core 202 and core to axon 203 communication links are provided.

Figure 3:
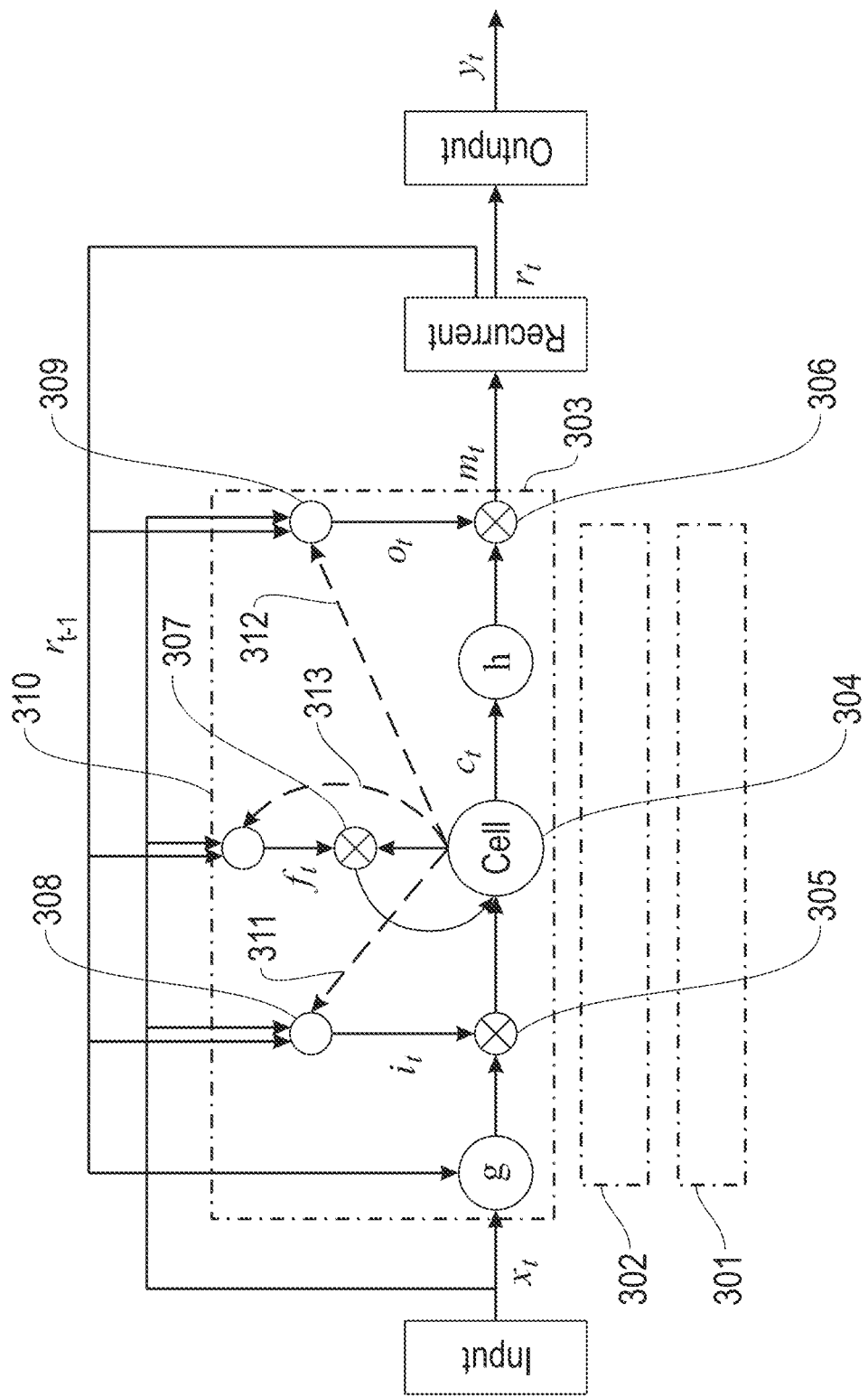
FIG. 3 depicts an exemplary Long Short-Term Memory (LSTM) architecture.

With reference now to FIG. 3, a Long Short-Term Memory (LSTM) is illustrated. LSTM is a recurrent neural network (RNN) architecture that models temporal sequences and their long-range dependencies more accurately than conventional RNNs. LSTM contains memory blocks 301 . . . 303 in the recurrent hidden layer.

The memory blocks, e.g., 303, contain memory cells 304 with self-connections storing the temporal state of the network in addition to special multiplicative units 305 . . . 307 called gates to control the flow of information. Each memory block contains an input gate 308 and an output gate 309. The input gate controls the flow of input activations into the memory cell. The output gate controls the output flow of cell activations into the rest of the network. The cell provides the basic recurrent loop. A forget gate 310 addresses the need to process continuous input streams that are not segmented into subsequences. The forget gate scales the internal state of the cell before adding it as input to the cell through the self-recurrent connection of the cell, therefore adaptively forgetting or resetting the cell's memory. In addition, some LSTM implementations contain peephole connections 311 . . . 313 from its internal cells to the gates in the same cell to learn precise timing of the outputs.

An LSTM network computes a mapping from an input sequence $x=(x_1, \ldots, x_T)$ to an output sequence $y=(y_1, \ldots, y_T)$ by calculating the network unit activations using the following equations iteratively from t=1 to T, where the W terms denote weight matrices (e.g., $W_{ix}$ is the matrix of weights from the input gate to the input), $W_{ic}$, $W_{fc}$, $W_{oc}$, are diagonal weight matrices for peephole connections, the b terms denote bias vectors ($b_i$ is the input gate bias vector), a the logistic sigmoid function, and i, f, o and c are respectively the input gate, forget gate, output gate and cell activation vectors, all of which are the same size as the cell output activation vector m, * is the element-wise product of the vectors, g and h are the cell input and cell output activation functions, generally tan h, and $\phi$ is the network output activation function, which is sigmoid or softmax in some embodiments. In various embodiments, g is tan h while h is σ.

$$i_t=\sigma(W_{ix}x_t+W_{im}m_{t-1}+W_{ic}c_{t-1}+b_i) \quad \text{Equation 1}$$

$$f_t=\sigma(W_{fx}x_t+W_{fm}m_{t-1}+W_{fc}c_{t-1}+b_f) \quad \text{Equation 2}$$

$$c_t=f_t*c_{t-1}+i_t*g(W_{cx}x_t+W_{cm}m_{t-1}+b_c) \quad \text{Equation 3}$$

$$o_t=\sigma(W_{ox}x_t+W_{om}m_{t-1}+W_{oc}c_t+b_0) \quad \text{Equation 4}$$

$$m_t=o_t*h(c_t) \quad \text{Equation 5}$$

$$y_t=\phi(W_{ym}m_t+b_y) \quad \text{Equation 6}$$

There are a number of challenges regarding the architecture of conventional LSTM when it comes to adapting the model for neuromorphic hardware. For example, multiplication is not simply implemented with spiking neurons, although it may be more easily implemented with firing rate neurons. It is likewise not easily implemented without conductance-based synapses (shunting). tan h has a positive and negative range, but a number of spikes is by definition nonnegative. Any input-output relationship of a spiking neuron will thus cut off the negative half of tan h. Synapses may be low precision and axon types may be limited.

In some embodiments of neuromorphic hardware, network connectivity may be limited by the size of the crossbar, which is 256×256 in some embodiments. Combined with a low-precision constraint of synapses, if four axon types are required to code for a single synaptic weight, then every connection in the firing-rate model will correspond to four connections in the spiking model.

In some embodiments of neuromorphic hardware, more than 1 ms may be necessary to process a time step. In particular unless a population code is available that can execute in a 1 ms, accumulation/integration of a signal for multiple milliseconds may be necessary. To achieve recurrence, a maximum delay of 15 ms per time step provides an approximate upper limit. Any more delay, and additional neurons will be required just to implement recurrent connections.

As outlined above, LSTMs pose a number of challenges that do not allow for a straightforward implementation with spiking neural networks (SNNs). Accordingly, the present disclosure provides for a variety of algorithmic and architectural approaches enabling LSTM on neuromorphic hardware.

In various embodiments of a LSTM according to embodiments of the present disclosure, all neuronal units (tan h in alternative LSTM implementations) are replaced with rectified linear units (ReLUs) during training. In some embodiments, these neuronal units are replaced with spiking neurons during deployment. Likewise, input, forget, and output gates (sigmoids in alternative LSTM implementations) are replaced by ReLUs during training and spiking neurons during deployment. In particular, while alternative cell embodiments use a sigmodal function requiring multiplications in the gating mechanism, embodiments of the present disclosure use binary gates that have ON/OFF states, thus avoiding the need for multiplication which is ill suited to spiking neurons. Likewise, while the input/output gates in alternative cell embodiments are tan h functions, embodiments of the present disclosure use quantized clipped linear units in place of tan h functions.

In various embodiments, all synaptic weights and neuronal bias values are discretized as so that they adhere to the architectural requirements of neuromorphic hardware. Since it is not possible to have a negative number or a fraction of spikes, all activity values are discretized and bounded to be nonnegative. This is true for the input signal as well. It will be appreciated that conversion from input signal or rate-based activity to spike trains may be performed using a variety of coding schemes without departing from teaching of the present disclosure.

The effect of a gate on information flow (which is multiplicative in alternative LSTM implementations) is replaced with a binary gating mechanism that either passes through all information when open or blocks all information flow when closed. As such, these gates act as modulatory gates. When they are open, they enable information flow, but they do not cause it. Because of this property, the gating mechanism has the quality of being compatible with any neuronal coding scheme, since the neuronal signal that is passed through is not modified.

In various embodiments, recurrence is implemented via synaptic connections with nonzero delays. This allows the adaptation of a single forward pass into a processing window of a flexible number of milliseconds, during which the signal is integrated. This integration window can be used to implement any desired population code. Processing windows are implemented with a clock signal.

In various embodiments, peephole connections (such as 311 . . . 313) are excluded for the sake of simplicity. An LSTM core according to various embodiments has a high ratio of connections to neurons, and adding peephole connections further increases this ratio.

Figure 4:
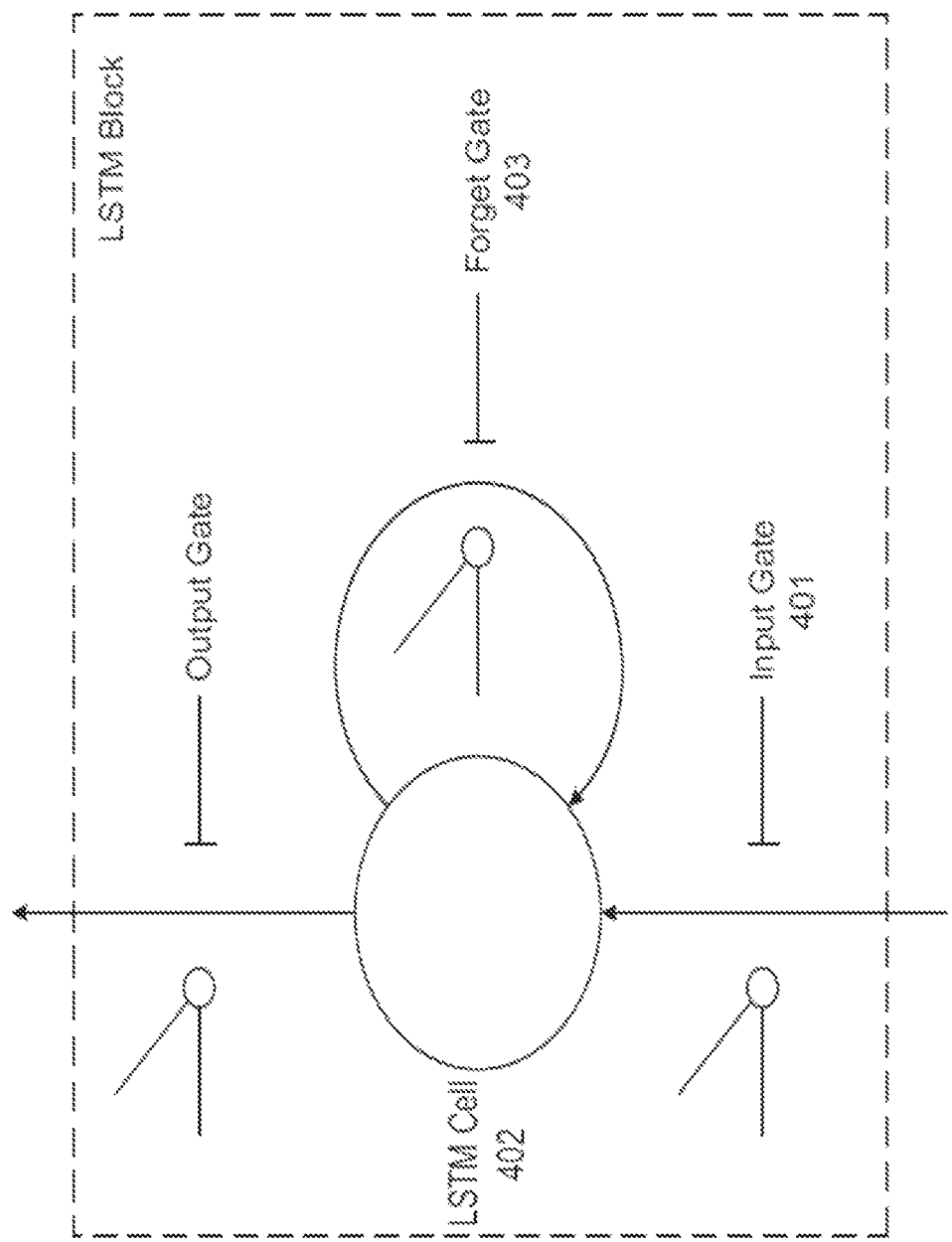
FIG. 4 is a high level view of an exemplary LSTM.

Referring to FIG. 4, a high level view of an LSTM is provided. When input gate 401 is open, an input or target value is used to update the LSTM cell 402. When input gate 401 is closed, for example to avoid a detractor value, LSTM cell 402 maintains its state. Forget gate 403, when closed, suppresses maintenance of LSTM cell 402.

Figure 5:
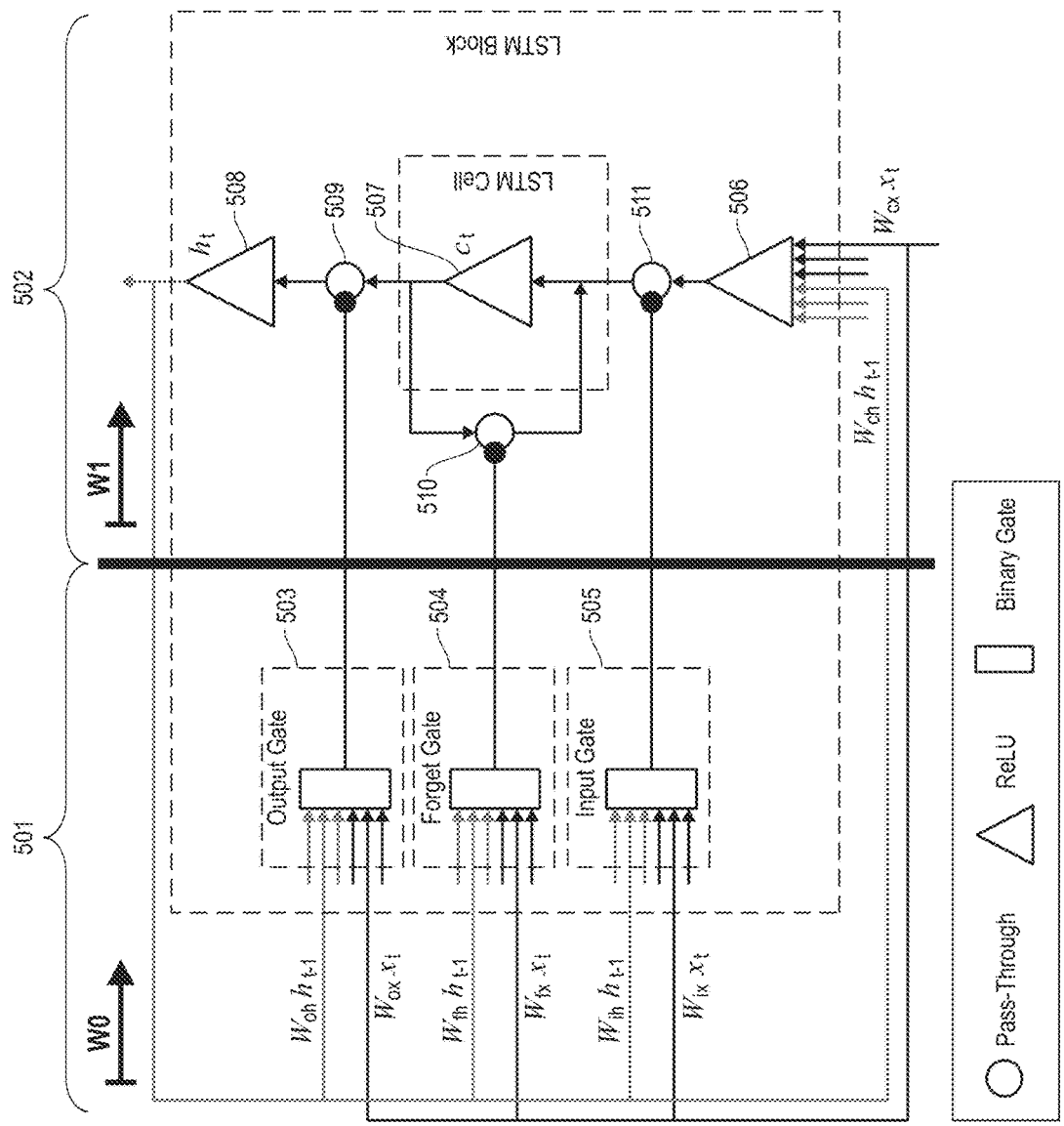
FIG. 5 illustrates a spiking network architecture for an LSTM according to embodiments of the present disclosure.

Referring to FIG. 5, a spiking network architecture for an LSTM is illustrated according to various embodiments of the present disclosure. The functioning of the network is divided across time windows W0 (501) and W1 (502). Gates 503 . . . 505 integrate input and previous LSTM output during window W0 to determine whether they should be open or closed during window W1. A closed gate will inhibit pass-through neurons, which then block information flow. All connections have nonzero delays, which are tuned so as to allow coherent information flow.

In various embodiments, the system of equations that describe an LSTM without peephole connections are given below.

$$i_t = \sigma(W_{ix}x_t + W_{ih}h_{t-1} + b_i) \quad \text{Equation 7}$$

$$f_t = \sigma(W_{fx}x_t + W_{fh}h_{t-1} + b_f) \quad \text{Equation 8}$$

$$c_t = g(f_t * c_{t-1} + i_t * g(W_{cx}x_t + W_{ch}h_{t-1} + b_c)) \quad \text{Equation 9}$$

$$o_t = \sigma(W_{ox}x_t + W_{oh}h_{t-1} + b_o) \quad \text{Equation 10}$$

$$h_t = g(o_t * c_t). \quad \text{Equation 11}$$

The nonlinearity g(•) is now be part of the variable $c_t$ in Equation 9, as opposed to Equation 3, in order to accommodate implementation of these equations with spiking neurons.

The resulting SNN model that implements these equations is depicted in FIG. 5. Here, processing of a single forward pass is split into two distinct processing windows, W0 (501) and W1 (502). During the first window (W0), all three gates 503 . . . 505 integrate incoming information consisting of both the input signal ($x_t$) and the network's output from the previous timestep ($h_{t-1}$). A clock signal signifies the end of W0, and the network enters the second processing window (W1). During the second window, the other neuronal units in the system (ReLUs 506 . . . 508), integrate information coming from the input, the network's previous output, and the gates' output.

According to various exemplary embodiments based on TrueNorth, activity values are non-negative ∈[0, max], and are discretized to the number of spikes. In some such embodiments, gates are on/off switches. During training, steep rectified linear units (ReLUs) ∈[0,1] may be used. During testing, a switch ∈{0,1} may be used. At other times, ReLUs ∈[0, max] may be used. In such embodiments, neuron biases should be smaller than the spike threshold of a TN neuron. In some exemplary embodiments, an LSTM block is implemented using 11 TN neurons and 14 axons.

Figure 6:
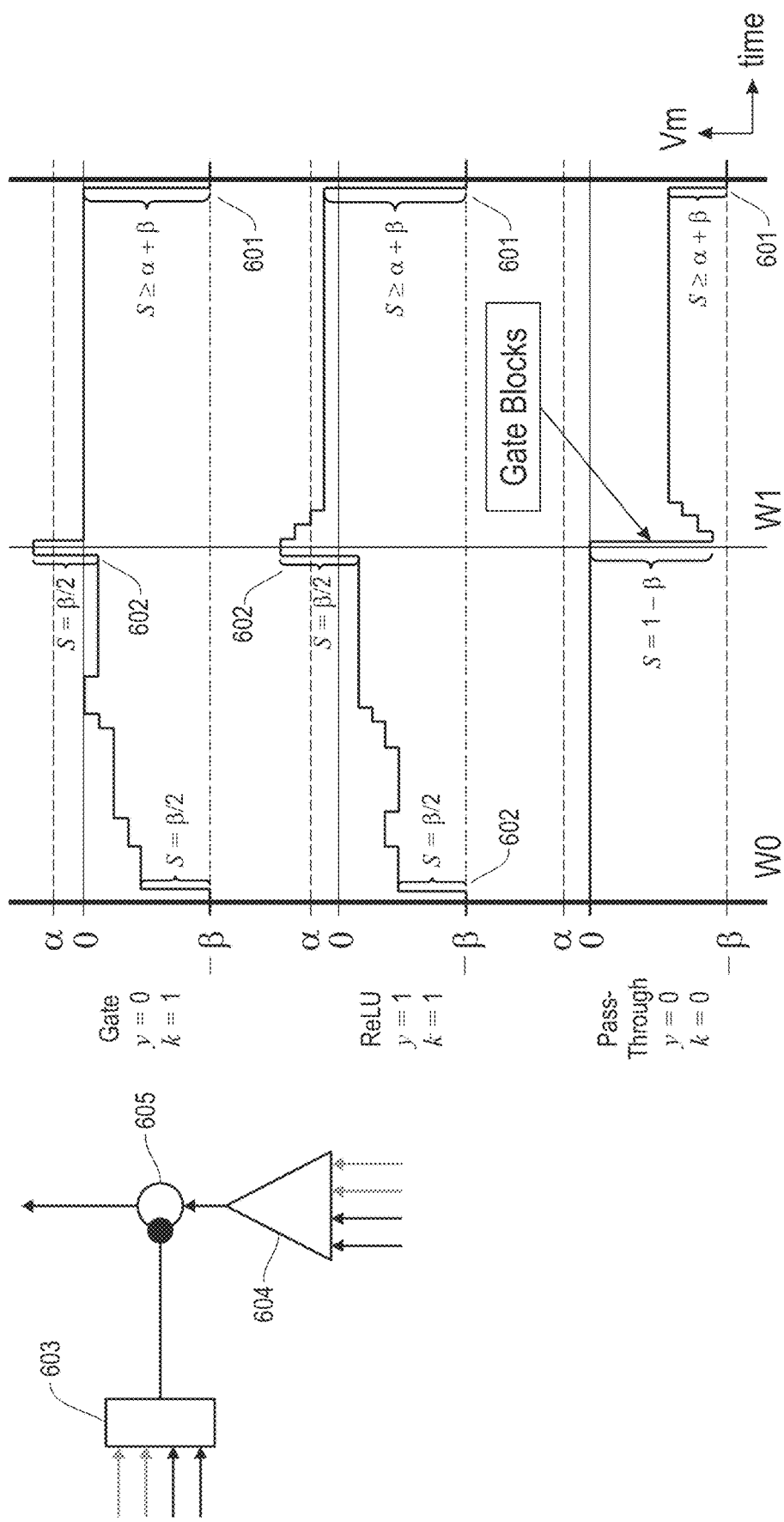
FIG. 6 is a timing diagram of a spiking network architecture for an LSTM according to embodiments of the present disclosure.

The gating mechanism is implemented with a gate 503 . . . 505 and a corresponding pass-through neuron 509 . . . 511. This mechanism is further illustrated in FIG. 6, which provides a timing diagram for the gating mechanism, where the membrane potential (Vm) of different cells is plotted over time. Time window W0 spans the sub-threshold integration of incoming spikes. Time window W1 spans the readout of stored spikes. If a gate 603 is closed, it will send a single spike at the beginning of W1 to the pass-through neuron 605, effectively inhibiting it from emitting any spikes in W1. Otherwise the gate 603 is silent, and the pass-through neuron 605 simply relays all spikes received from the ReLU 604. The system operates with two clocks to regulate neural activity in the two processing windows. A compute clock signal 601 hyperpolarizes a cell. A readout clock signal 602 depolarizes a cell.

Both the gate 603 and the ReLU 604 start out with their membrane potential set to the negative floor, $-\beta$. At the very beginning of the first processing window (W0), a compute clock signal is sent to the neurons, which sets the membrane potential to the mid-point in the interval $[-\beta,\alpha]$, where $\alpha$ is the spike threshold. The consequence of this is that no incoming spike will now trigger an action potential. Instead, the number of incoming spikes will be reflected by the value of the cell's membrane potential. At the end of W0, another compute clock signal is sent that pushes the membrane potential close to the spike threshold.

If sufficient spikes have been received during W0, at the beginning of W1 the gate will emit a single spike. This spike is sent to the pass-through neuron 605 and causes its membrane potential to be highly hyperpolarized. If the pass-through neuron now receives additional spikes from the ReLU 604, they will have no effect on the pass-through neuron's activity. Thus, the gate effectively blocks all incoming signals.

On the other hand, if the gate does not emit a spike at the beginning of W1, then the pass-through neuron 605 will simply relay (or pass through) all spikes received from the ReLU 604.

Because the pass-through neuron 605 is memoryless, it will simply relay the incoming spikes without modifying inter-spike interval. Therefore, this gating mechanism is compatible with any desired coding scheme. Furthermore, the gate is implemented with a minimum number of spikes (that is, a single spike), making the mechanism very efficient.

The input-output relationship of a rectified linear unit (ReLU) adapted for use according to the present disclosure can be described in terms of Equation 12 where $x \in [0,15]$ is the input signal (number of spikes), $y \in [0,15]$ is the output signal (number of spikes), s is a slope or gain factor, $y_{max}$ is an optional cutoff value for y (e.g., $y_{max}$=15 spikes per processing window), and b is a bias value.

$$y(x)=\min(y_{max}, s\max(0,x)+b) \quad \text{Equation 12}$$

In a single-core architecture according to embodiments of the present disclosure using processing windows, $y_{max}$ can be achieved by restricting the number of ticks in a processing window. In other words, if the processing windows are limited to 16 ticks each, set $y_{max}$=15 (reserving 1 tick for the clock signal) in the shadow network, and the spiking network will automatically respect that cutoff.

The slope in Equation 12 is inversely proportional to the a parameter of a ReLU according to various embodiments–$\alpha=1/s$. If the spike threshold is set to a, the bias b is zero, and the membrane potential $V_m$ starts at zero, then exactly s spikes are required to make the membrane potential reach $\alpha$. To make this work with nonzero bias values, the bias is set so that it defines the starting point of the membrane potential integration, so that $V_m(t=0)=-b$.

Figure 7:
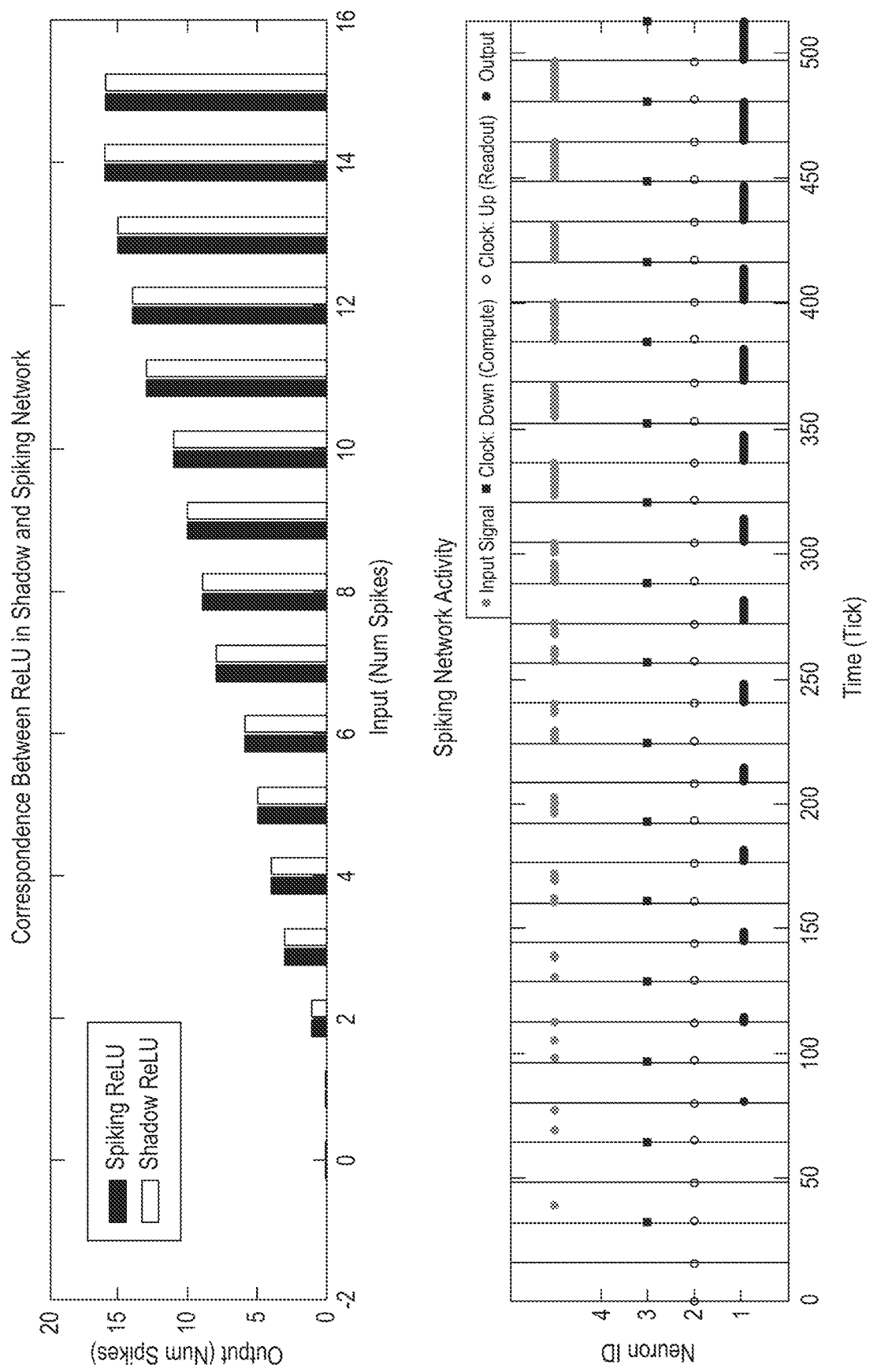
FIG. 7 illustrates the correspondence between a rectified linear unit (ReLU) in a shadow network and a spiking network according to embodiments of the present disclosure.

A ReLU in various single-core architectures according to the present disclosure is a $\gamma=1$, $\kappa=1$ neuron that performs signal integration during W0 in its subthreshold regime. For this, $V_m$ is positioned exactly in the middle between the lower floor $(-\beta)$ and the spike threshold $(\alpha)$, so that any incoming (excitatory or inhibitory) spikes do not push $V_m$ over these thresholds. This is achieved with two clock signals. A first clock signal 601 sends $V_m$ so far down that it is capped at $-\beta$ ($\kappa=1$). A second clock signal 602 immediately following the first (readout) positions $V_m=(\alpha-\beta)/2$, which is as far from $\alpha$ and $\beta$ as possible. Subsequent spikes will then alter $V_m$. At the end of W0 another readout clock signal is received, pushing $V_m$ closer to $\alpha$. If enough spikes have been recorded during W0, $V_m$ is now above the spike threshold. If $\gamma=1$, the neuron will start emitting all the recorded spikes. This leads to one-to-one correspondence between Equation 12 and a spiking ReLU as illustrated in FIG. 7.

A pass-through neuron is a memoryless neuron that relays all the spike it receives by having a single spike push 14, above the spike threshold. This can be achieved with $\alpha=1$, $\gamma=0$, VR=0, $\Delta=0$, and an axon type with weight 1. According to various embodiments, the pass-through neuron is silent during W0, which may be achieved by drastically hyperpolarizing its membrane potential, so that none of the incoming spikes will trigger a spike. An axon type is reserved to send $V_m$ close to $-\beta$. The value $\kappa=0$ and another axon type is reserved to send $V_m$ below $-\beta$, so that the membrane potential is reset to zero.

According to various embodiments, the binary gate is a $\gamma=0$, $\kappa=0$ neuron that can be used in combination with a pass-through neuron to gate information flow. During W0, it integrates a signal in its subthreshold regime. At the beginning of W1, it is either silent (allowing for information to flow), or it emits a single spike, which is used to deactivate a pass-through neuron and hence shut off all information flow.

Figure 8:
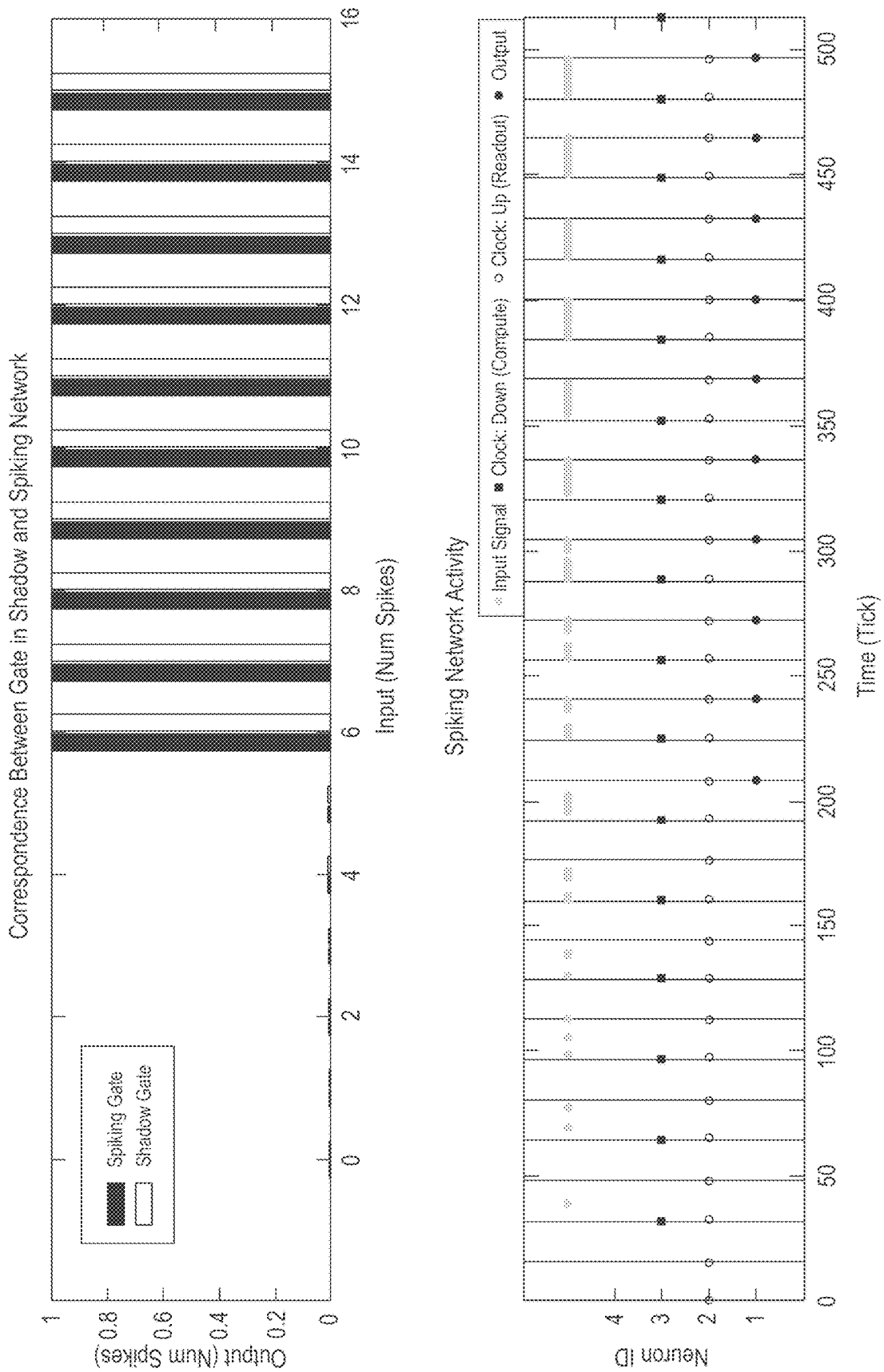
FIG. 8 illustrates the correspondence between a gate in a shadow network and a spiking network according to embodiments of the present disclosure.

The difference between a spiking version of a ReLU and the binary gate is that the binary gate has $\gamma=0$. This will make sure that as soon as the neuron emits a single spike at the beginning of W1, its membrane potential will be set back to zero, allowing for no more spikes to be emitted as illustrated in FIG. 8.

LSTM is suitable for acoustic modeling, such as sequence learning, and sequence-to-sequence transformations. LSTM and RNNs are applicable to various sequence prediction and sequence labeling tasks. For example, in language modeling, a LSTM RNN model shows improvements over RNNs alone. LSTM models have been shown to perform better than RNNs on learning context-free and context-sensitive languages. Bidirectional LSTM (BLSTM) networks that operate on the input sequence in both directions to make a decision for the current input are suitable for phonetic labeling of acoustic frames. BLSTM networks used together with a Connectionist Temporal Classiciation (CTC) layer and trained from unsegmented sequence data may outperform a Hidden Markov Model (HMM) on online and offline handwriting recognition. BLSTM with a CTC output layer and an RNN transducer is suitable for acoustic-phonetic speech analysis.

RNNs have various disadvantages compared to LSTM, particularly with respect to training. In particular, error signals flowing backwards in time may either blow up or vanish in an RNN implementation.

Figure 9D:
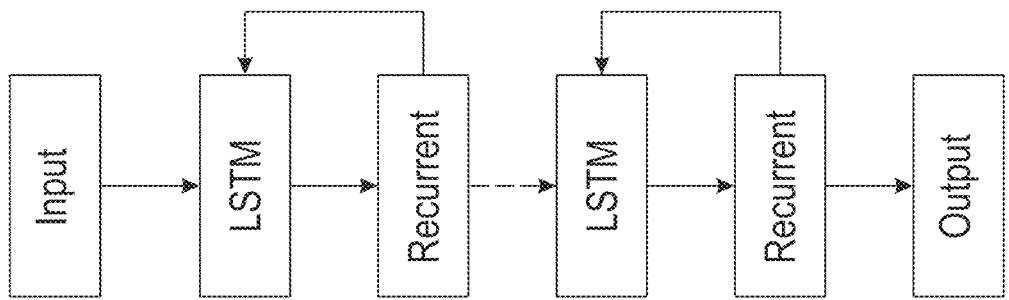
FIGS. 9A-D illustrate exemplary arrangements of LSTMs according to embodiments of the present disclosure.
Figure 9C:
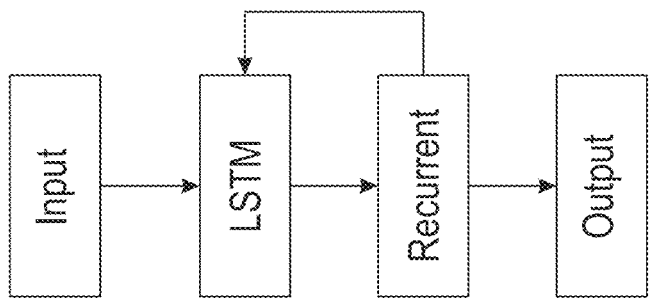
Figure 9B:
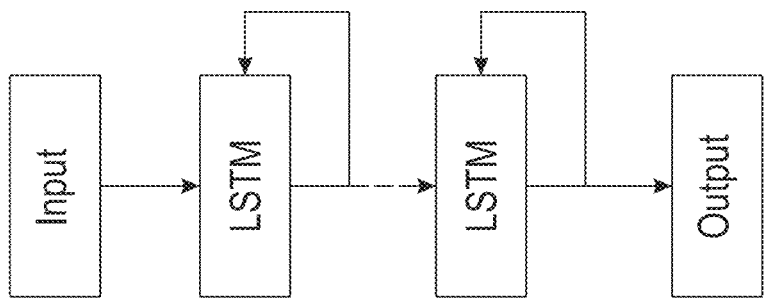
Figure 9A:
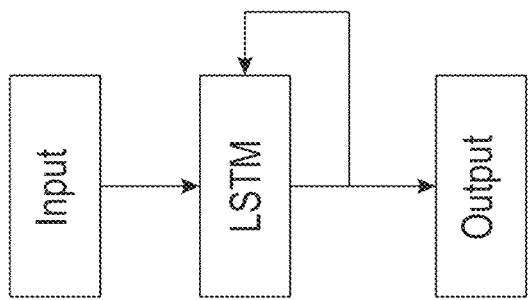

It will be appreciated that an LSTM according to the present disclosure may be integrated into a variety of systems. For example, FIG. 9A illustrates a LSTM arrangement without further components. FIG. 9B illustrates a DLSTM. FIG. 9C illustrates a LSTMP. FIG. 9D illustrates a DLSTMP.

Figure 10:
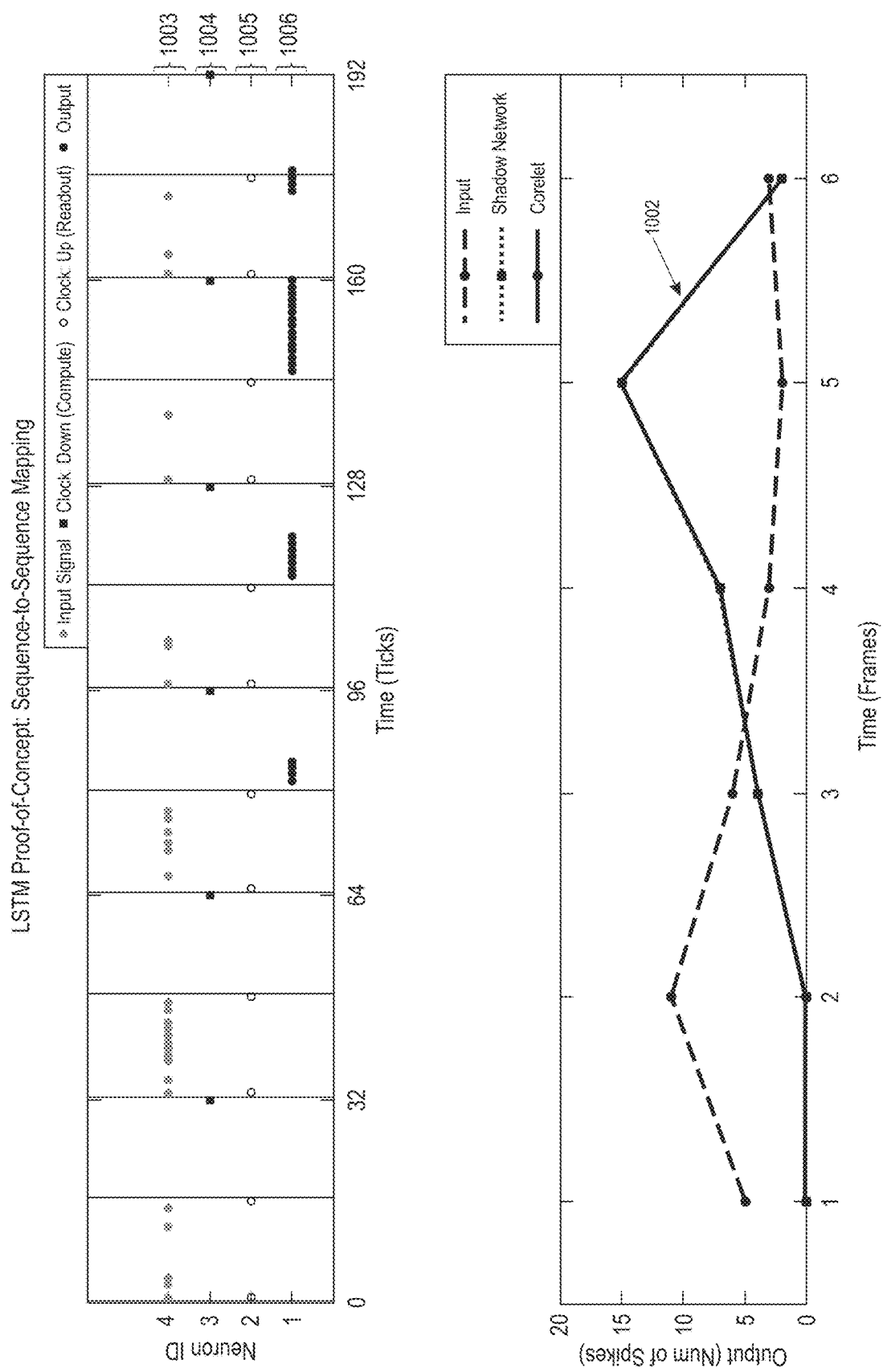
FIG. 10 illustrates the temporal evolution of neuronal activity in a spiking network according to embodiments of the present disclosure.

According to various embodiments of the present disclosure, a neuromorphic hardware based LSTM is applied to sequence-to-sequence transformation. Referring to FIG. 10, in an exemplary embodiment, a shadow network consisting of a single LSTM block is trained to transform an arbitrary input sequence 1001 to a different arbitrary output sequence. At the end of training, the shadow network's output was equivalent to the desired output sequence 1002. Converting the network parameters (learned weights and biases) to an implementation according to the present disclosure demonstrated one-to-one correspondence between neuronal activity in the shadow network and the spiking network 1002.

FIG. 10 also illustrates the temporal evolution of neuronal activity in the spiking network. A total of six input patterns (32 ticks each) were sequentially presented to the network in processing window W0 (first 16 ticks, 1003). The network's output was then determined by counting spikes of the output unit during W1 (second 16 ticks; 1006).

Figure 11:
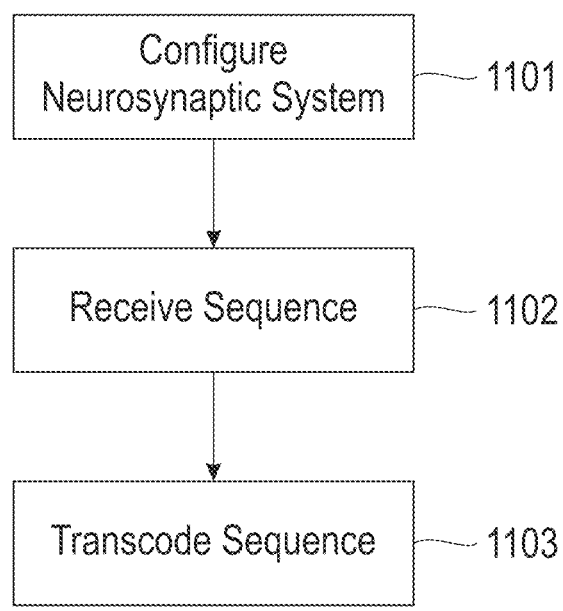
FIG. 11 illustrates a method of sequence to sequence encoding according to embodiments of the present disclosure.

Referring to FIG. 11, a method for sequence to sequence encoding according to various embodiments of the present disclosure is illustrated. At 1101, a neuromorphic system is configured with a predetermined plurality of configuration parameters comprising synaptic weights and neuronal biases. The neuromorphic system comprises a memory cell, an input gate operatively coupled to the memory cell and adapted to selectively admit an input to the memory cell, and an output gate operatively coupled to the memory cell an adapted to selectively release an output from the memory cell. The memory cell is adapted to maintain a value in the absence of input. At 1102, a first sequence of spikes is received at the neuromorphic system. At 1103, the first sequence of spikes is transcoded by the neuromorphic system via the memory cell into a second sequence of spikes the transcoding being determined by the synaptic weights and neuronal biases.

Figure 12:
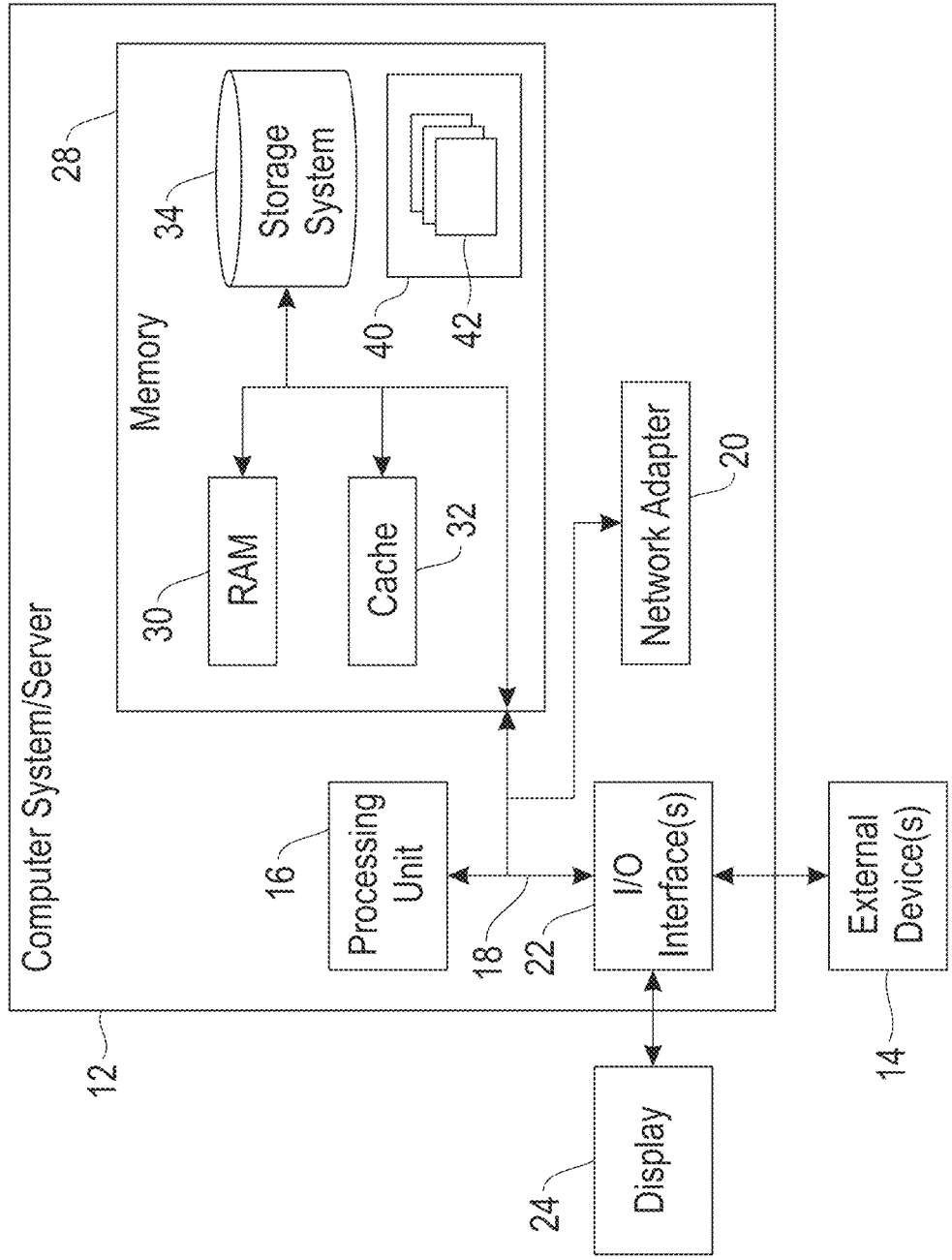
FIG. 12 depicts a computing node according to an embodiment of the present invention.

Referring now to FIG. 12, a schematic of an example of a computing node is shown. Computing node 10 is only one example of a suitable cloud computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a spiking neurosynaptic core comprising
   a memory cell,
   an input gate operatively coupled to the memory cell and adapted to selectively admit an input to the memory cell during a first time interval, wherein
      the input gate has a membrane potential,
      the input gate is operatively coupled to a plurality of spiking neurons, the input gate is configured to update its membrane potential according to a number of spikes received from the plurality of spiking neurons during a second time interval preceding the first time interval,
      the input gate is configured to block the input to the memory cell when the membrane potential exceeds a predetermined threshold, wherein the blocking of the input comprises preventing all input signals to the memory cell, and wherein the membrane potential controls the input gate, and
   an output gate operatively coupled to the memory cell and adapted to selectively release an output from the memory cell, and wherein
      the memory cell is adapted to maintain a value in the absence of input.

2. The system of claim 1, wherein the memory cell comprises a rectified linear unit.

3. The system of claim 1, wherein the input gate comprises a binary gate.

4. The system of claim 1, wherein the output gate comprises a binary gate.

5. The system of claim 1, wherein the neurosynaptic core further comprises:
a forget gate operatively coupled to the memory cell and adapted to selectively clear the value of the memory cell.

6. The system of claim 5, wherein the forget gate comprises a binary gate.

7. The system of claim 1, further comprising:
a clock operatively coupled to the neurosynaptic core, the clock providing a signal demarking at least the first and second time interval, and wherein:
   during the second time interval, the neurosynaptic core integrates an input with an output from a prior period,
   during the first time interval, the neurosynaptic core integrates the input with the output from the prior period and with the output of the input gate and the output gate from the second time interval.

8. The system of claim 2, wherein the rectified linear unit applies a discrete function to an input to generate an output.

9. The system of claim 1, wherein the neurosynaptic core is configured with a predetermined plurality of configuration parameters comprising synaptic weights and neuronal biases, the synaptic weights and neuronal biases being selected such that:
   upon receiving a first sequence of spikes at the neurosynaptic core, the first sequence of spikes is transcoded by the neurosynaptic core via the memory cell into a second sequence of spikes based on the synaptic weights and neuronal biases.

10. A method comprising:
configuring a neuromorphic system with a predetermined plurality of configuration parameters comprising synaptic weights and neuronal biases, the neuromorphic system comprising
   a memory cell,
   an input gate operatively coupled to the memory cell and adapted to selectively admit an input to the memory cell during a first time interval, wherein
      the input gate has a membrane potential,
      the input gate is operatively coupled to a plurality of spiking neurons, the input gate is configured to update its membrane potential according to a number of spikes received from the plurality of spiking neurons during a second time interval preceding the first time interval,
      the input gate is configured to block the input to the memory cell when the membrane potential exceeds a predetermined threshold, wherein the blocking of the input comprises preventing all input signals to the memory cell, and wherein the membrane potential controls the input gate, and
   an output gate operatively coupled to the memory cell and adapted to selectively release an output from the memory cell, and wherein
      the memory cell is adapted to maintain a value in the absence of input;
receiving a first sequence of spikes at the neuromorphic system;
transcoding the first sequence of spikes by the neuromorphic system via the memory cell into a second sequence of spikes the transcoding being determined by the synaptic weights and neuronal biases.

11. The method of claim 10, further comprising:
determining the plurality of configuration parameters by training a shadow network.

12. The method of claim 10, wherein the memory cell comprises a rectified linear unit.

13. The method of claim 10, wherein the input gate comprises a binary gate.

14. The method of claim 10, wherein the output gate comprises a binary gate.

15. The method of claim 10, wherein the neuromorphic system further comprises:
a forget gate operatively coupled to the memory cell and adapted to selectively clear the value of the memory cell.

16. The method of claim 15, wherein the forget gate comprises a binary gate.

17. The method of claim 10, the neuromorphic system further comprising:
a clock operatively coupled to the neuromorphic system, the clock providing a signal demarking at least the first and second time interval, and wherein:
   during the second time interval, the neurosynaptic core integrates an input with an output from a prior period,
   during the first time interval, the neurosynaptic core integrates the input with the output from the prior period and with the output of the input gate and the output gate from the second time interval.

18. The method of claim 12, wherein the rectified linear unit applies a discrete function to an input to generate an output.

19. A computer program product for providing a long-short term memory, the computer program product comprising a computer readable storage medium having program instructions embodied therewith, the program instructions readable by a processor to cause the processor to perform a method comprising:

configuring a neuromorphic system with a predetermined plurality of configuration parameters comprising synaptic weights and neuronal biases, the neuromorphic system comprising a memory cell, an input gate operatively coupled to the memory cell and adapted to selectively admit an input to the memory cell during a first time interval, wherein the input gate has a membrane potential, the input gate is operatively coupled to a plurality of spiking neurons, the input gate is configured to update its membrane potential according to a number of spikes received from the plurality of spiking neurons during a second time interval preceding the first time interval, the input gate is configured to block the input to the memory cell when the membrane potential exceeds a predetermined threshold, wherein the blocking of the input comprises preventing all input signals to the memory cell, and wherein the membrane potential controls the input gate, and an output gate operatively coupled to the memory cell and adapted to selectively release an output from the memory cell, and wherein the memory cell is adapted to maintain a value in the absence of input;

receiving a first sequence of spikes at the neuromorphic system;

transcoding the first sequence of spikes by the neuromorphic system via the memory cell into a second sequence of spikes the transcoding being determined by the synaptic weights and neuronal biases.

* * * * *